D. WILLIAMSON.
NUT LOCK.
APPLICATION FILED DEC. 22, 1919.
1,364,338.
Patented Jan. 4, 1921.
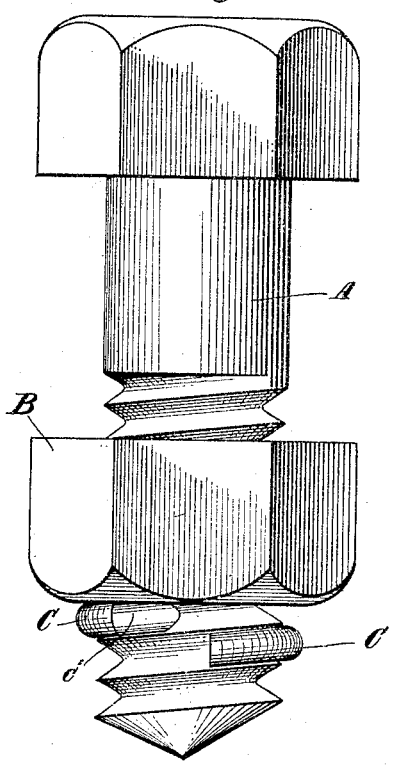
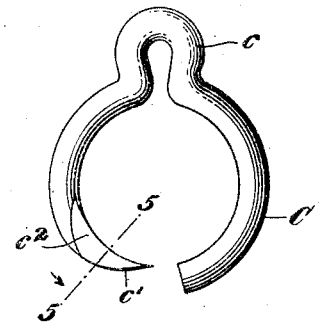
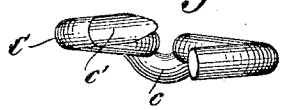
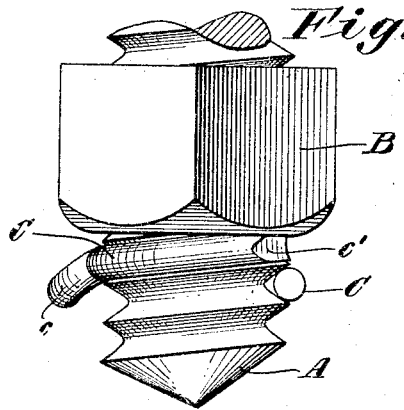
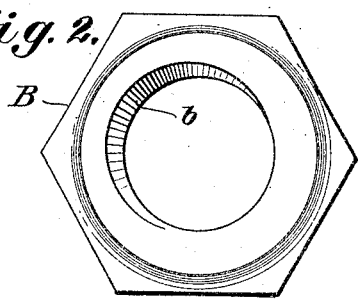
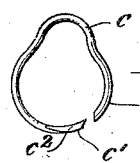
Inventor
David Williamson.
By Jas. H. Griffin
his Attorney

UNITED STATES PATENT OFFICE.

DAVID WILLIAMSON, OF NEW YORK, N. Y., ASSIGNOR TO WILLIAMSON HOLDING CORPORATION, OF NEW YORK, N. Y., A CORPORATION OF DELAWARE.

NUT-LOCK.

1,364,338.  Specification of Letters Patent.  Patented Jan. 4, 1921.

Application filed December 22, 1919. Serial No. 346,630.

*To all whom it may concern:*

Be it known that I, DAVID WILLIAMSON, a citizen of the United States, residing in the city of New York, borough of Manhattan, county and State of New York, have invented certain new and useful Nut-Locks, of which the following is a specification.

This invention is a nut lock, and the object of the invention is to provide a nut lock which will positively preclude a nut from working loose on a bolt, by the employment of a simple locking member which may be economically manufactured, expeditiously positioned in coöperating relation with the nut to be locked, and the operations of which do not require the modification of nuts or bolts, as now made.

Features of the invention other than those specified will be apparent from the hereinafter detailed description read in conjunction with the accompanying drawings.

In the accompanying drawing, I have illustrated one practical embodiment of the present invention, but the construction shown therein is to be understood as illustrative, only, and not as defining the limits of the invention.

Figure 1 shows, in elevation, a well-known form of bolt, and coöperating nut, the latter of which is locked upon the former by a locking device embodying the present invention.

Fig. 2 is an underneath view of the nut shown in Fig. 1, said nut being removed from the bolt in the interest of clearness.

Fig. 3 is a face view of a locking device embodying the present invention.

Fig. 4 is an edge elevation thereof.

Fig. 5 is a section taken on the line 5—5 of Fig. 3.

Fig. 6 is a fragmental elevation of the bolt and nut shown in Fig. 1. This latter elevation is taken from a position at substantially right angles to the elevation of Fig. 1, and Fig. 7 shows the device in a slightly different shape.

Referring to the drawings, A designates a bolt of any well-known and conventional type, provided with a nut B, which it is desired to lock against inadvertent loosening, when the bolt and nut are assembled to secure two or more parts together.

The nut B may be any one of a large number of types commonly used, and is provided with an interior threaded passage adapted to screw onto the threads of bolt A. In the making of the nuts an internal thread extends between the two faces of the nut in the form of a continuous helix. It, however, enters one face in a cam-like sweep and intersects the other face in a similar manner. This cam-like sweep is produced by the meeting of the helical thread with the substantially plane surface forming each face of the nut. It is on all nuts and serves, when assembling a bolt and nut, to lead the thread of the bolt into the thread of the nut to facilitate the screwing of the nut upon the bolt.

In Fig. 2 of the drawings, wherein the underneath face view of the nut B is shown, the cam-like sweep referred to is designated by the reference numeral *b*, and this view clearly shows how the interior thread of the nut intersects with the plane surface of the face of the nut, the cam surface *b* making a long, even, clockwise sweep and entering the interior of the nut. This cam surface will be found on all nuts and plays an important part in the locking device of this invention, next to be described.

In Figs. 3, 4 and 7 are shown views of a helical locking member C. In the form of the preferred embodiment of this invention, the member C is shown as formed from wire rod bent to form substantially one complete convolution of a helix, whereby it is adapted to be screwed upon the thread of the bolt in the same manner as a nut. However, the rod is preferably resilient so that it will compress the threads tightly when in place upon the bolt. In order to facilitate the removal or withdrawal of the helix member C from a bolt, a portion of the wire rod may be bent into the form of a loop *c*, to provide a handle which may be grasped when screwing or unscrewing the helix. This handle *c* is not absolutely essential, but its preferably employed, not only because it facilitates the operation of the locking member, but, at the same time, increases its resiliency so that it will not unduly bind the threads of the bolt during the operation of screwing said helix onto or off of the bolt.

At least one free end of the helix C is tapered or flattened out on its outer side to produce the face *c'* which, for reasons hereinafter manifest, is slightly dished, as shown more particularly in Figs. 5 and 6. The forming of the face $c'$ is preferably accomplished by swaging, and in the swaging operation, the portion of the die complementary to the portion which forms the face $c'$, is preferably substantially V-shaped, the sides of the V-shaped portion of the die converging downwardly at substantially the same angle at which the threads are cut in the bolt with which the resulting locking member is adapted to coöperate.

This converging angle is generally about 60°. As a result of the swaging operation described, the free end of the helix C, referred to, has the cross sectional shape shown in Fig. 5. As shown in said view, the free end of the helix is provided with the two inwardly converging faces $c^2$ and the outer slightly dished tapering face or surface $c'$. It will, of course, be understood that this invention is not limited in the making to the method just enumerated, but this method has been described so that the formation of one free end of the helix may be thoroughly understood.

The shape of the loop $c$ may, of course, be varied without departing from this invention, but is preferably as shown in Fig. 7, as this form is bent on such easy curves as to facilitate the manufacture thereof and enhance the durability of the device.

When locking member C, just described, is secured onto a threaded bolt with the tapered end of said member foremost, it will be manifest that the peculiar formation of said tapered end will cause the inwardly converging surface $c^2$ to snugly fit into the thread of the bolt and lead the helical locking member C around the thread of the bolt and in juxtaposition with said thread. In other words, the helical portion C will lie in the helical convolution formed by the thread of the bolt, while the forward end of said helix will taper off from the full thickness of the wire rod from which the helix is formed, inwardly to the base of the thread.

Assuming, therefore, that the nut B has been screwed onto a bolt to the predetermined position desired, the helix C may be subsequently screwed onto the bolt so as to follow up the nut, much in the same manner as a second nut is frequently screwed onto a bolt to lock the one previously positioned thereon. However, instead of merely engaging with the adjacent face of the nut B, the tapered forward end of the locking member C, as said member is screwed up to the nut, comes into engagement with the cam surface $b$, hereinbefore described, of the nut and follows said cam surface until it literally enters the nut, as clearly shown in Fig. 1 of the drawings. That is to say, a portion of the slightly dished surface $c'$ engages with the cam surface $b$ of the nut and, as the locking member C is screwed into place, the said dished surface continues to engage with the cam surface $b$. As a result of this, the tapered end of member C is led into the nut until the wedging or cam action between said faces becomes so great that it wedges the inwardly converging faces $c^2$ into tight, gripping engagement with the thread of the bolt, and precludes further advance of the locking member C. The position of the parts at this time is shown in Fig. 1, and this is the position in which the locking member is locked relative to the bolt and nut when in its locking position.

It will be obvious that, when the parts are in the positions described, any tendency of the nut B to loosen would only serve to more tightly wedge the converging faces $c^2$ into the thread of the bolt and, at the same time, greatly increase the wedging or cam action between the cam surface $b$ of the nut and the slightly dished surface $c'$ of the locking member. There is thus a double wedging action set up which will increase as the nut B is unscrewed. However, the engagement of the parts is such that even the slightest movement of the nut in a direction to unscrew the same will so tightly wedge the tapered portion of the locking member that further movement of the nut in this direction is absolutely precluded. The nut is thus securely locked in place against inadvertent unscrewing rotation on the bolt.

In the preferred form of the invention hereinbefore described and specifically shown in Figs. 3 and 4, only one end of the locking member C is tapered and, accordingly, said member must be so screwed upon the bolt that the tapered end will travel in advance of the remainder of said member. This form of the invention works very satisfactorily and is very economical to manufacture. It will be understood, however, that if desired, both free ends of the member C may be tapered and formed as described so that the locking member will be reversible.

In the embodiment of the invention shown in Figs. 3 and 4, wherein only one end of the member is tapered, the projecting handle $c$ may be turned down, as shown in Fig. 6, so that it will be out of close proximity to the adjacent face of the nut B and may be more readily grasped for the purpose of manipulating said member. However, when member C is made reversible by tapering both ends, the projecting handle $c$ should extend out in a position substantially perpendicular to the axis of the helix. It will be understood also that, while the handle $c$ is preferably included, it is not absolutely essential, as one free end of the member C may be turned out to serve as a handle.

Throughout the foregoing description, I have set forth that the cam surface *c'* is slightly dished, and this construction is the one which is preferable, since it precludes the tapered end of member C from creeping away from the nut when said nut starts to work loose, as would be the case if the cam surface *c'* were made convex, instead of slightly concave, in cross-section. In contradistinction, the slightly dished surface causes the tapered end of member C to be drawn closer to the nut as said nut works loose, and assures the double gripping or wedging action specified. It will be manifest, however, that this invention is not limited to the transverse dishing of the cam surface *c'*, as it would operate with great efficiency even though it were made flat.

It will be understood that any one helical member is not limited to employment with any particular size of bolt, since its resilient qualities adapt it to slightly varying sizes of bolts and slightly varying numbers of threads per inch. It will be noted, from an inspection of Fig. 5, that the inner edge of member C is rounded at its tapered end, so that at no time does the inner edge of said member C engage with the face of the thread of the bolt, since, if it did engage, the proper wedging action between the parts could not be obtained.

Other slight modifications may be made, from time to time, in adapting the invention to its various environments, without departing from the spirit or scope of the invention. The fundamental feature of the invention is the provision of a locking member with a tapered or cam-like portion adapted to coöperate with the cam surface of a nut, and this invention is not limited to the specific details of the construction shown and described, but is as broadly novel as is commensurate with the appended claims.

Having thus fully described the invention, what I claim as new, and desire to secure by Letters Patent, is:

1. A nut lock embodying a split ring, adapted to lie in a helical channel of a threaded member adjacent a nut positioned on said member, one free end of the ring being tapered in thickness to form a cam surface adapted to engage with the cam surface on the nut formed by the intersection of the internal thread with the face of the nut, whereby unscrewing of the nut causes the two cam surfaces to engage and set up a wedging action to preclude rotation of the nut.

2. A nut lock embodying a rod having a substantially helical form, at least one end of said helical rod being provided with a cam surface, whereby when the helical rod is positioned on a threaded member adjacent a nut, the cam surface of the helical rod engages with the cam surface on the nut formed by the intersection of the thread with the adjacent face of said nut to preclude rotation of the nut in one direction.

3. A nut lock embodying a rod having a substantially helical form, at least one end of said helical rod being provided with a cam surface, whereby when the helical rod is positioned on a threaded member adjacent a nut, the cam surface of the helical rod engages with the cam surface on the nut formed by the intersection of the internal thread with the adjacent face of said nut to preclude rotation of the nut in one direction, and a projecting portion formed on said rod serving as a handle to facilitate the positioning of the helical rod upon the threaded member.

4. A nut lock embodying a rod, bent substantially in the form of a helix, at least one end of the rod being provided with a cam surface.

5. A nut lock embodying a resilient rod bent substantially in the form of a helix, at least one end of the rod being provided with a cam surface.

6. A nut lock embodying a rod bent in substantially the form of a helix, at least one end of which is provided at the outer side of the helix with a cam surface, the inner side of said rod adjacent said cam surface being formed with converging faces, the angle of convergence being substantially equal to the angle at which the threads are cut on a threaded member, with which the nut lock is adapted for use.

7. A nut lock embodying a split ring, at least one free end of which is provided on its outer surface with a slightly dished cam surface, adapted to coöperate with the cam surface of the nut when brought into coöperative relation therewith.

8. A nut lock embodying a split ring of substantially helical form, one end of which tapers substantially to a point whereby, when the ring is brought into coöperative relation with a nut, the tapered portion of said ring engages with the cam surface of the nut, formed by the interior thread of the nut, intersecting the substantially plain adjacent face thereof, for the purpose of precluding unscrewing rotation of said nut.

In testimony whereof I have signed my name to this specification.

DAVID WILLIAMSON.